United States Patent Office 2,894,703
Patented July 14, 1959

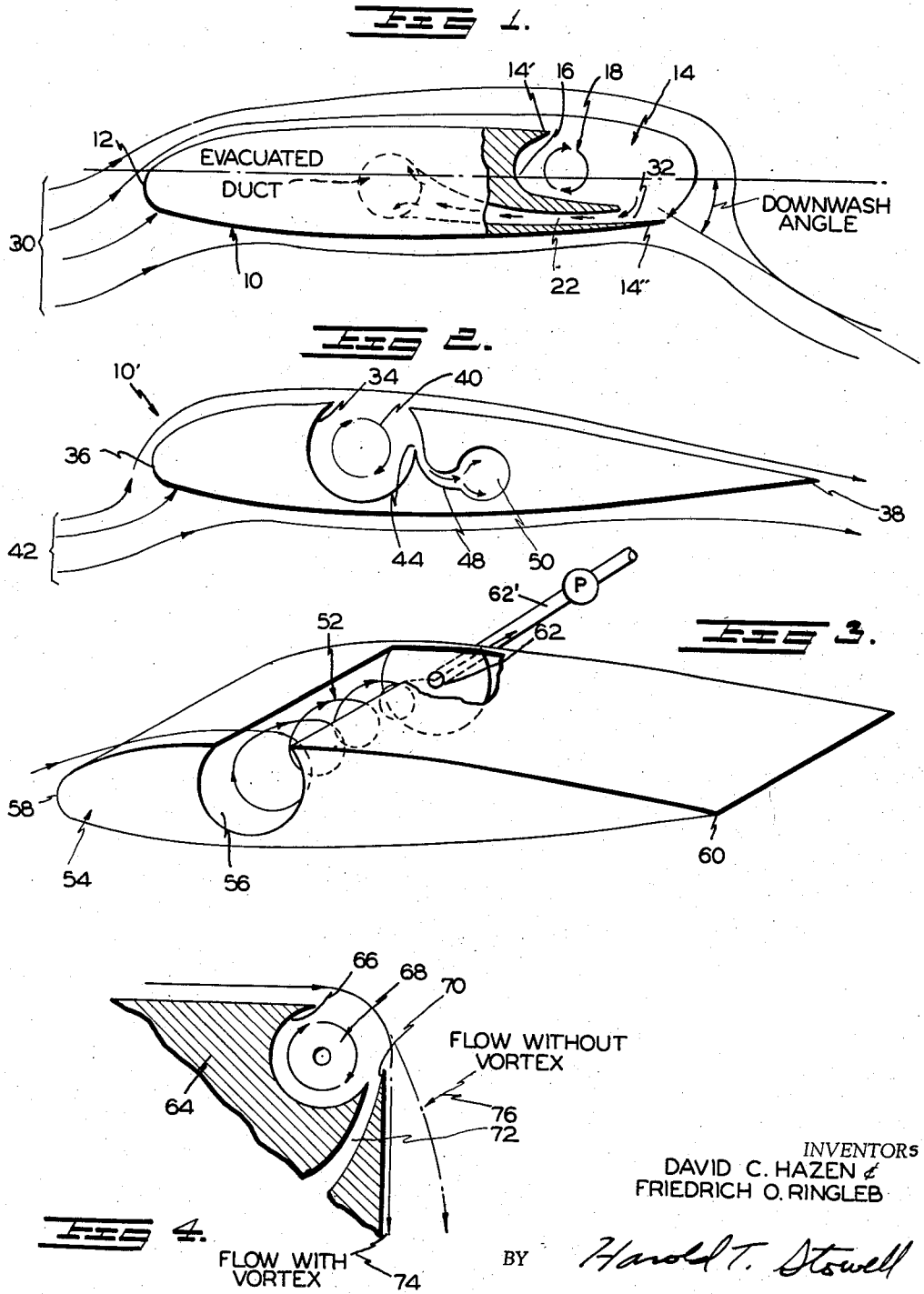

2,894,703
BOUNDARY LAYER CONTROL SYSTEM

David C. Hazen, Princeton, and Friedrich O. Ringleb, Woodbury Heights, N.J., assignors to Research Corporation, New York, N.Y., a corporation of New York Application May 27, 1954, Serial No. 432,655

3 Claims. (Cl. 244—42)

This invention relates to air flow control and in particular to methods and apparatus for controlling air flow by means of suction-stabilized vortices.

The invention will be more particularly described in reference to boundary layer control means for improving the efficiency of aircraft lift surfaces and the like as shown in the embodiments illustrated in the accompanying drawings. However, such disclosure is an illustrative example of but one of the advantageous applications of the principles constituting the present invention and not a limitation thereof.

The necessity of producing high lift at low speeds is becoming increasingly evident in both military and commercial aircraft applications, as the minimum flight speeds of aircraft have been steadily increased as the design trends have been for larger, heavier and faster aircraft.

There are, in general, only two methods by which the lift of a wing profile can be increased. The first and most common of these methods is to increase the angle of attack of the wing. Normally the amount of permissible angle of attack increase is limited by the tendency of the boundary layer to thicken in the adverse pressure gradient resulting in a flow separation and a stall or loss of lift. The second method is to change the angle of downwash of the wing without a corresponding change in the geometric angle of attack. A wing flap which changes the camber of the wing is a common method of performing this downwash change. As in the case of the simple change in angle of attack, the effectiveness of the flap is limited by the tendency of the air to separate from it.

Conventional aircraft of today employ systems which utilize either or both of these methods. The slot or slat located at the leading edge energizes the boundary layer and delays separation, while the flap alters the camber of the profile, thus changing the circulation and resulting in a higher lift without a corresponding change in angle of attack.

The main disadvantage of the slot as a high lift device is that it produces its lift at a high angle of attack, frequently creating severe visibility problems and penalizing the performance of the aircraft with a cumbersome and heavy landing gear. The flap is in general a satisfactory device if one accepts high lift at the expense of added drag and heavy pitching moments.

In general, an increase of drag is not an objectionable characteristic in the landing configuration as it permits a steeper angle of glide at a given speed than would otherwise be possible. It is however objectionable at take-off when high lift and low drag would be desirable. Thus the control of the drag is as important as the control of lift.

As both the slot and the flap are limited to a relatively low amount of lift increase due to the flow separation, attempts have been made to increase the effectiveness of these systems by the addition of power. Boundary layer control systems work on much the same principle as the slot. By either energizing the boundary layer by blowing through slots or removing it when it thickens by sucking through slots, separation can be delayed until very high angles and values of lift can be obtained.

Another approach to the problem has been the use of suction or blowing to cause the flow to adhere to a deflected flap. Such a system can produce values of lift frequently double that resulting from the deflection of the flap alone without any increase in angle of attack. It is clear that such a system must have an effect on the boundary layer, but this is not its major function nor is this effect nearly as pronounced as on a system designed to utilize boundary layer control because the slots are usually located in a turbulent boundary layer region and hence are relatively ineffective from a stabilization point of view.

It is therefore an object of this invention to provide simple yet highly efficient means for energizing the boundary layer flow over aircraft surfaces to provide very high lifts at relatively low angles of attack.

It is a further object to provide a method and apparatus to cause a wing profile to change its lift without a corresponding change in angle of attack.

Another object is to provide a boundary control system of the type wherein the increasing capacity relative to angle of attack greatly increases the stalling angle of the wing and/or the effectiveness of the aircraft wing control surfaces.

A further object is to provide a boundary layer control system whereby the amount of power employed to control the boundary layer is kept to a minimum through the use of the energy of a vortex stabilized by suction to guide the flow of air from a region of low pressure to a region of higher pressure.

In the past attempts have been made to utilize vortices as flow controlling devices through the use of natural vortices generated by the action of the free air stream. However, we have found that only under special conditions do vortices actually naturally exist and then they are generally of insufficient strength to have much effect upon the air flow.

We have found, however, that through the use of suction, which may be applied axially or peripherally to create and stabilize vortices very effective control is possible.

The nature of the present invention may be stated in general terms as including a member having an extended surface presented to a flow of air, a cusp in said surface chordwise of the flow of air over said extended surface, and means for drawing off a portion of the air from within the cusp.

With reference to the accompanying drawings in which like designations indicate similar parts throughout the several views:

Fig. 1 is a diagrammatic side view of one form of the present invention showing a suction stabilized cusp adjacent the trailing edge of an aircraft wing;

Fig. 2 is a diagrammatic side view of an aircraft wing having a vortex with means for drawing off air peripherally;

Fig. 3 is a diagrammatic perspective view similar to Fig. 2 with means for drawing off air axially; and Fig. 4 is a diagrammatic sectional view of the boundary layer control means of the invention as applied to a corner.

Referring in particular to Fig. 1 of the drawings the reference numeral 10 designates a typical laminar flow air foil or wing having a leading edge 12 and a trailing edge 14. Adjacent the upper lip 14' of the trailing edge portion of the wing a cusp 16 is provided within which a vortex generally indicated at 18 will form upon the passage of air over the wing surface, as shown by the stream lines with arrows 30.

Adjacent the lower lip 14" a suction slot 22 is provided to draw off chordwise, or peripherally a portion of the air from the vortex 18. The suction slot may be connected to an evacuated duct as shown in the drawing, which duct is connected to a suitable source of vacuum. For example, the suction may be provided by the aircraft power plant, auxiliary motor-pump units, exhaust gas driven pump, or by means of one or more venturis or the like.

The length of the cusp 16 and in turn the length the annular vortex 18 may be variously modified to meet the special conditions necessary to provide the increased lift desired of the particular wing. While the orifice 32 of the suction slot 22 may be coextensive with the length of the cusp 16, the length may also be variously modified to meet the draw off requirements necessary to establish a vigorous vortex resulting in a substantial increase in the flow path of the air and/or to increase the angle of downwash adjacent the trailing edge of the wing.

With the cusp and suction slot located at the trailing edge of the wing, the vortex established thereby will contribute the maximum amount of downwash momentum to the flow of air over the wing and cause the profile to change its lift without a corresponding change in angle of attack.

In Fig. 2 of the drawing a typical laminar flow air foil 10' is shown wherein a cusp 34 is provided in the upper surface of the wing intermediate the leading and trailing edges 36 and 38 respectively, within which a vortex generally indicated 40 will form upon the passage of air over the wing surface, as shown by the stream lines with arrows 42.

Within the confining walls of the cusp 34 is provided one or more suction slots 44 adapted to peripherally draw off a portion of the air from the vortex 40. The slot 44 is connected by duct 48 to an evacuated chamber 50 which is connected to a suitable source of vacuum as hereinbefore described in reference to Fig. 1 of the illustrative embodiments of the invention.

With the suction-stabilized vortex positioned intermediate the wing edges, effective boundary layer control is obtained by causing the flow to adhere to the wing profile without separation even at extreme angles of attack.

However, this form of the invention does not appreciably increase the downwash angle, as in the case where the cusp is provided at or near the trailing edge section.

Referring to Fig. 3 of the drawing another form of the invention is shown wherein a suction stabilized spiral vortex or sink 52 is provided in the upper surface of an aircraft wing 54.

In this form of the invention a cusp 56 is provided in the upper surface of the wing 54 intermediate the leading trailing edges 58 and 60. A suction orifice 62 centrally disposed in one end wall of the cusp defining structure axially draws off air from within the cusp to form and stabilize the spiral vortex 52. The orifice 62 is connected by suitable ducts 62' to a source of vacuum such as pump 63.

The suction-stabilized spiral vortex of Fig. 3 is effective to cause the flow of air over the upper surface of the wing to adhere to the wing profile without separation even at extreme angles of attack as hereinbefore pointed out with reference to Fig. 2 of the drawings.

It has been found that the quantity of suction required to stabilize the vortex in the cusp is dependent on several factors, for example, the particular shape of the cusp, the type of air draw off, the velocity of the free stream flow and the profile of the structure embodying the cusp.

In general, however, the suction quantities required to stabilize the vortex may be expressed in terms of a non-dimensional suction coefficient $C_q$ defined as $$C_q = \frac{Q}{VS}$$

where $Q$ = suction quantity—cu. ft./sec.
$V$ = free stream flow velocity—ft./sec.
$S$ = characteristic (e.g.—wing) area—ft.$^2$.

Where the characteristic area is wing area it has been found when air draw off is axial, as described in reference to Fig. 3 of the drawings, suction coefficients of from about .002 to about .01 have provided very satisfactory results.

Tests have also shown that for chordwise or peripheral air draw-off higher values of CQ are required to properly stabilize the vortex, with values ranging from about .01 to about .06 providing very satisfactory results.

Referring to Fig. 4 a further form of the present invention is shown with the suction-stabilized vortex applied to a corner of an air duct, for example, in a wind tunnel.

In Fig. 4 64 is a portion of a corner wall of a wind tunnel wherein it is desired to turn the air stream without separation of the stream from the wall surfaces. In the corner a cusp 66 is provided within which a vortex 68 is to be established. The cusp is provided with a chordwise or peripheral suction slot 70 which is connected by duct 72 to a source of vacuum not shown in the drawing. The effect of the suction-stabilized vortex in preventing air stream separation is shown diagrammatically by the full and broken stream lines with arrows 74 and 76 respectively.

From the foregoing description of the embodiments illustrated in the accompanying drawings it will be seen that the present air flow control system fully accomplishes the aims, objects and advantages of the invention, and it is further pointed out that the illustrative embodiments are only examples of advantageous applications of the constructions and principles constituting the invention defined in the following claims.

We claim:

1. In an air foil adapted to be presented to a flow of air including a leading edge and a trailing edge connected by spaced extended surface members, boundary layer control means comprising a cusp in one of said extended surface members followed by a smoothly curved depression extending into said air foil between the spaced extended surface members with the axis of the smoothly curved depression extending substantially parallel to one of the edges of the air foil and transversely to the flow of air over said extended surface members, and means for drawing off a portion of the air in the smoothly curved depression whereby a stabilized vortex is formed in said smoothly curved depression when there is a flow of air over the air foil wherein the means for drawing off a portion of the air from within the smoothly curved depression comprises means defining a slot within the wall forming said depression and means connecting said slot to a source of reduced pressure.

2. In an air foil adapted to be presented to a flow of air including a leading edge and a trailing edge connected by spaced extended surface members, boundary layer control means comprising a cusp in one of said extended surface members followed by a smoothly curved depression extending into said air foil between the spaced extended surface members with the axis of the smoothly curved depression extending substantially parallel to one of the edges of the air foil and transversely to the flow of air over said extended surface members, and means for drawing off a portion of the air in the smoothly curved depression whereby a stabilized vortex is formed in said smoothly curved depression when there is a flow of air over the air foil wherein the means for drawing off a portion of the air from within the smoothly curved depression comprises wall means at one end of the smoothly curved depression having an orifice therein and means connecting the orifice in said wall means to a source of vacuum.

3. In an air foil adapted to be presented to a flow of air including a leading edge and a trailing edge connected by spaced extended surface members, boundary layer control means comprising a cusp in one of said extended surface members followed by a smoothly curved depression extending into said air foil between the spaced extended surface members with the axis of the smoothly curved depression extending substantially parallel to one of the edges of the air foil and transversely to the flow of air over said extended surface members, a source of reduced pressure, and means connecting said source of reduced pressure and the smoothly curved depression for drawing off a portion of the air therein whereby a stabilized vortex is formed in said smoothly curved depression when there is a flow of air over the air foil.

References Cited in the file of this patent

UNITED STATES PATENTS

| | | |
|---|---|---|
| 1,719,293 | Gripon | July 2, 1929 |

FOREIGN PATENTS

| | | |
|---|---|---|
| 476,258 | Great Britain | Dec. 6, 1937 |
| 511,650 | Great Britain | Aug. 22, 1939 |
| 610,623 | Great Britain | Oct. 19, 1948 |
| 825,134 | France | Nov. 27, 1937 |

OTHER REFERENCES

"Aviation Week," issue of Nov. 2, 1953, page 39.